Patented Sept. 14, 1943

2,329,672

UNITED STATES PATENT OFFICE 2,329,672

MANUFACTURE OF AROMATIC PRODUCTS FROM LIGHT OLEFINS

Charles Weizmann, London, England

No Drawing. Application October 29, 1940, Serial No. 363,383. In France January 17, 1940

3 Claims. (Cl. 260—673)

This invention relates to the manufacture of aromatic products from light olefins, that is to say, normally gaseous olefins, in other words, olefins having from two to five carbon atoms.

The object of the present invention is the provision of a simple and efficient process for producing from light olefins as above defined, such as propylene, butylene or the impure olefins resulting from the cracking of mineral oils, entirely aromatic liquid products.

The invention consists in a process for the production of aromatic products with a higher number of carbon atoms, in the course of which a light olefin as above defined is passed over the oxides of zirconium, hafnium, thorium, cerium or of the metals of the rare earths, or over mixtures of these oxides, at a temperature of about 600° to about 800° C. and preferably at about atmospheric pressure.

The invention also consists in a process as set forth in the preceding paragraph, according to which the light olefins consists of butylene either pure or as the gas obtained in cracking mineral oils, and the temperature of the reaction is in the neighborhood of 600° C.

The invention also consists in a process as set forth in the second preceding paragraph, according to which the light olefin is propylene and the temperature of the reaction is about 700° C.

The invention also consists in a process for the production of aromatic products substantially as hereinafter described.

The invention also consists in aromatic products whenever produced by a process hereinafter described.

Example I

At a temperature of 600°, a transformation into entirely aromatic products, e. g. benzene, ethylbenzene, styrene and naphthalene, has been achieved by passing pure butylene, impure butylene or the gas obtained in cracking mineral oils over the above-mentioned oxides.

Example II

Propylene is transformed into products similar to those mentioned in Example I by the same process at a temperature of about 700° C.

I claim:

1. A process for the conversion of olefins into aromatic liquid products with a higher number of carbon atoms, which comprises subjecting an olefin having two to five carbon atoms within a temperature range closely approximating to 600° C. to 800° C. to the action of a catalyst selected from the group consisting of the oxides of zirconium, hafnium, thorium, cerium, and of metals of the rare earths, and mixtures containing a plurality of these bodies.

2. A process for the treatment of olefins having two to five carbon atoms for the formation of entirely aromatic liquid products with a higher number of carbon atoms which comprises the step of passing a light olefin over a catalyst chosen from the following group, namely, the oxides of zirconium, hafnium, thorium, cerium, and of metals of the rare earths, and mixtures containing a plurality of these bodies, at a temperature closely approximating to 600° C. to 800° C. and at a pressure closely approximating to atmospheric pressure.

3. The process which comprises subjecting an olefin having two to five carbon atoms selected from the group consisting of propylene, butylene, and the products resulting from the cracking of mineral oils within a temperature range closely approximating to 600° C. to 800° C. at a pressure closely approximating to atmospheric pressure, to the action of a catalyst chosen from the group consisting of the oxides of zirconium, hafnium, thorium, cerium, and of the metals of the rare earths, and mixtures containing a plurality of these bodies.

CHARLES WEIZMANN.